(12) United States Patent
Jain et al.

(10) Patent No.: US 12,248,364 B2
(45) Date of Patent: Mar. 11, 2025

(54) INTELLIGENT RECOVERY OF MANAGED DEVICES IN A MULTI-TENANT CLOUD ENVIRONMENT

(71) Applicant: Dell Products L.P., Round Rock, TX (US)

(72) Inventors: Shailesh Jain, Bangalore (IN); Srinivasa Ragavan Rajagopalan, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 76 days.

(21) Appl. No.: 18/164,674

(22) Filed: Feb. 6, 2023

(65) Prior Publication Data
US 2024/0264898 A1   Aug. 8, 2024

(51) Int. Cl.
*G06F 11/07* (2006.01)
*G06F 11/10* (2006.01)

(52) U.S. Cl.
CPC ...... *G06F 11/0793* (2013.01); *G06F 11/0709* (2013.01); *G06F 11/1004* (2013.01)

(58) Field of Classification Search
CPC ............. G06F 11/0793; G06F 11/0709; G06F 11/3006; G06F 11/1443; H04L 67/1061; H04L 67/1063; H04L 67/1044; H04L 41/06; H04L 41/0654

See application file for complete search history.

(56) References Cited

U.S. PATENT DOCUMENTS

| | | | | |
|---|---|---|---|---|
| 2015/0317194 A1* | 11/2015 | Sampath | ............... | H04L 41/145 714/703 |
| 2017/0324562 A1* | 11/2017 | Laffey | .................... | H04L 9/0891 |
| 2018/0157550 A1* | 6/2018 | Ivanov | .................. | H04L 41/122 |
| 2021/0334178 A1* | 10/2021 | Yang | .................... | G06F 11/3495 |

* cited by examiner

*Primary Examiner* — Yolanda L Wilson
(74) *Attorney, Agent, or Firm* — Kirton McConkie; Brian Tucker (57) ABSTRACT

Intelligent recovery of managed devices can be provided in a multi-tenant cloud environment. A recovery service can be employed to maintain management server details and device details for managed devices across multiple tenants. When a managed device loses connectivity to its management server, an agent on the managed device can access the recovery server to obtain management server details which have been associated with device details of the managed device. The agent can then use the management server details to regain connectivity to the management server.

10 Claims, 8 Drawing Sheets

INTELLIGENT RECOVERY OF MANAGED DEVICES IN A MULTI-TENANT CLOUD ENVIRONMENT

CROSS-REFERENCE TO RELATED APPLICATIONS

N/A

BACKGROUND

In cloud-based multi-tenant device management scenarios, the managed devices connect with a management server using a URL and a registration code that defines the managed device's tenant and group identity. For example, the registration code may include a tenant code that uniquely identifies the tenant and a group code that uniquely identifies a group within the tenant to which the managed device pertains. Typically, configuration policies are assigned to a managed device based on its group and therefore the group code can be used to identify each configuration policy that applies to the managed device.

When a managed device is registered with the management server, which is oftentimes accomplished by an administrator as part of deploying an agent on the managed device, the URL of the management server and the registration code are saved on the managed device. The managed device can then use the URL to communicate with the management server and can provide the registration code in such communications so that the management server can determine the tenant and group to which the managed device belongs. Notably, the management server typically provides management services to a large number of tenants each of which may typically have many groups of managed devices. Also, the management server oftentimes employs multiple URLs for communicating with managed devices. For example, a first set of tenants may be assigned to a first URL, a second set of tenants may be assigned to a second URL, and so on.

In this type of cloud-based multi-tenant device management scenario, various problems arise. For example, due to upgrades on the managed device, such as to the operating system or the agent or device tampering, such as due to a security attack or end user error, a file containing the URL and registration code may be deleted, corrupted, or otherwise inaccessible to the agent. As a result, the agent will no longer be able to communicate with the management server (i.e., the agent will not know where to send communications and/or will not be able to identify its tenant and group). In such a case, the agent may resort to performing a management server discovery process (which generally requires local infrastructure such as Network Discovery or Active Directory, which many tenants do not want) and may fallback to specifying a default group. This is turn may result in the management server providing default configuration policies to the agent. In many cases, the default configuration policies may cause the managed device to be unusable in the tenant's environment. For example, with a default configuration, a managed device may be blocked from accessing resources on a tenant's (e.g., an enterprise's) network.

To fix such issues, an individual would need to manually intervene to input the URL and/or registration code to allow the agent to successfully discover and register with the management server. However, administrators typically do not want the end users to perform such manual, error-prone actions and the administrators oftentimes do not have the bandwidth to perform such actions themselves. Similar issues exist when onboarding a new managed device.

BRIEF SUMMARY

The present invention extends to systems, methods, and computer program products for intelligent recovery of managed devices in a multi-tenant cloud environment. A recovery service can be employed to maintain management server details and device details for managed devices across multiple tenants. When a managed device loses connectivity to its management server, an agent on the managed device can access the recovery server to obtain management server details which have been associated with device details of the managed device. The agent can then use the management server details to regain connectivity to the management server.

In some embodiments, the present invention may be implemented as method for intelligent recovery of managed devices in a multi-tenant cloud environment. A recovery service can receive information about managed devices of a first management server. The information may include device details for each of the managed devices and management server details assigned to each of the managed devices. The recovery service can store the information about the managed devices. The recovery service can receive, from an agent on a first managed device of the managed devices, a recovery request that includes device details for the first managed device. The recovery service can access the stored information about the managed devices to identify stored device details that match the device details included in the recovery request. The recovery service can identify stored management server details that are associated with the stored device details. The recovery service can send the stored management server details to the agent on the first managed device to thereby enable the agent to use the stored management server details and the device details to connect the first managed device to the first management server.

In some embodiments, the present invention may be implemented as computer storage media storing computer executable instructions which when executed implemented a method for intelligent recovery of managed devices in a multi-tenant cloud environment. A first management server can send information about managed devices of the first management server to a recovery service. The information can include device details for each of the managed devices and management server details assigned to each of the managed devices. An agent on a first managed device of the managed devices can detect that the first managed device cannot connect to the first management server. The agent can then send a recovery request to the recovery service. The recovery request can include device details of the first managed device. The agent can receive a recovery response from the recovery service. The recovery response can include management server details that are associated with the device details of the first managed device. The agent can then use the management server details that are associated with the device details of the first managed device and the device details of the first managed device to connect the first managed device to the first management server.

In some embodiments, the present invention may be implemented as a system that includes a plurality of management servers, a plurality of managed devices, each of the managed devices being managed by one of the management server, and a recovery service accessible to each of the management servers and each of the managed devices. The recovery service can be configured to receive, from each of the management servers, information about the respective managed devices that the management server manages. The information can include device details for each of the managed devices and management server details assigned to each of the managed devices. The recovery service can also be configured to provide the management server details for a particular managed device when an agent on the particular managed device provides device details matching the management server details.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification and the claims, a managed device should be construed as including any end user computing device on which an agent is deployed to allow the end user computing device to be managed from a management server. For example, managed devices may be desktops, laptops, thin clients, tablets, smart phones, etc. A management server may be implemented in the cloud or on-premises.

Figure 1:
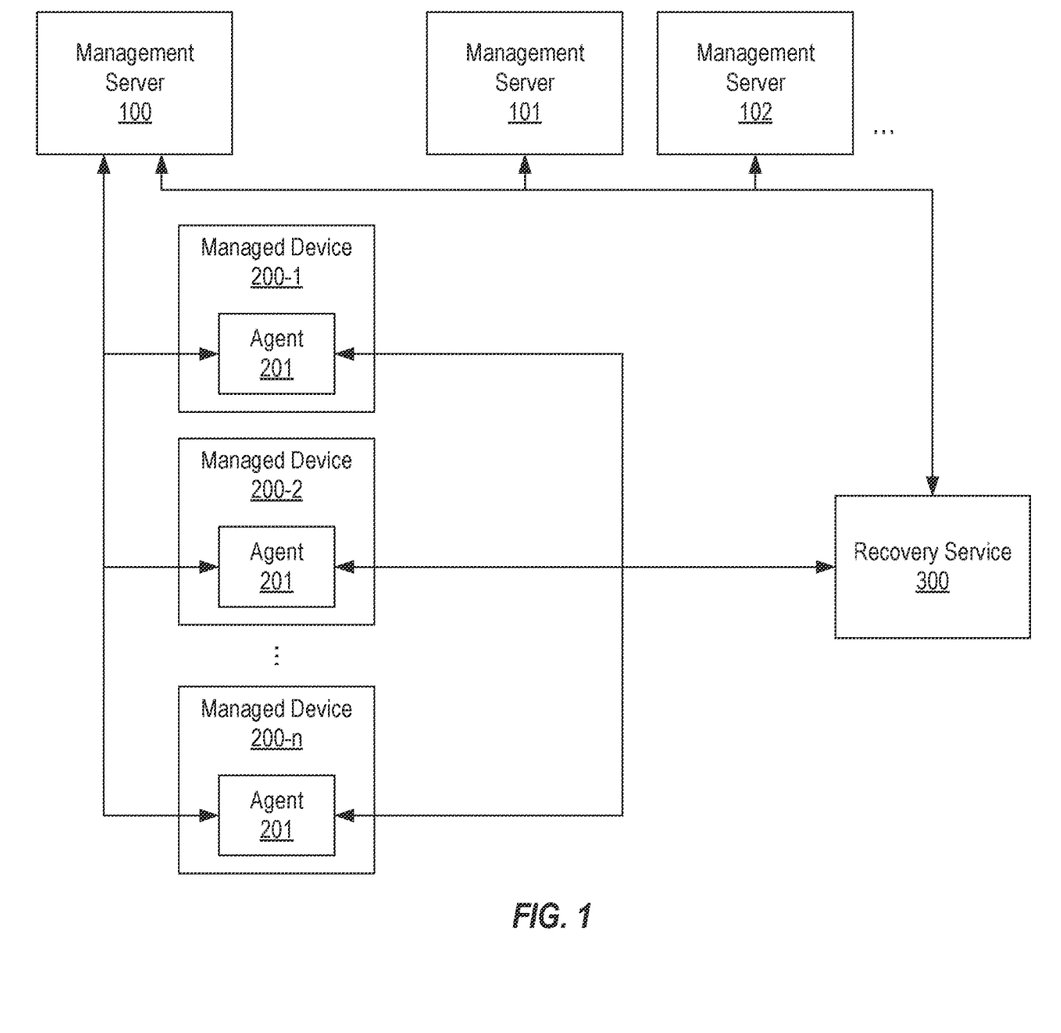
FIG. 1 provides an example of a computing environment in which embodiments of the present invention may be implemented.

FIG. 1 provides an example of a computing environment in which embodiments of the present invention may be implemented. The computing environment includes a management server 100 which is used to manage managed devices 200-1 through 200-n (individually and collectively managed device(s) 200). In some embodiments, managed devices 200 may pertain to multiple tenants. In other embodiments, managed devices 200 may pertain to a single tenant. FIG. 1 also shows that there may be other management servers 101, 102, etc., each of which may be used to manage managed devices (not shown) of other tenants. Each managed device 200 can include an agent 201. The computing environment also includes a recovery service 300. As an overview, agent 201 can be configured to communicate with management server 100 to enable management of managed devices 200 from management server 100 and can be configured to communicate with recovery service 300 to enable intelligent recovery of managed devices 200. Management server 100 can also be configured to communicate with recovery service 300 to facilitate intelligent recovery of managed devices 200. Although not shown, other managed devices that are managed from management server 101, 102, etc. may also include an agent 201.

Figure 2A:
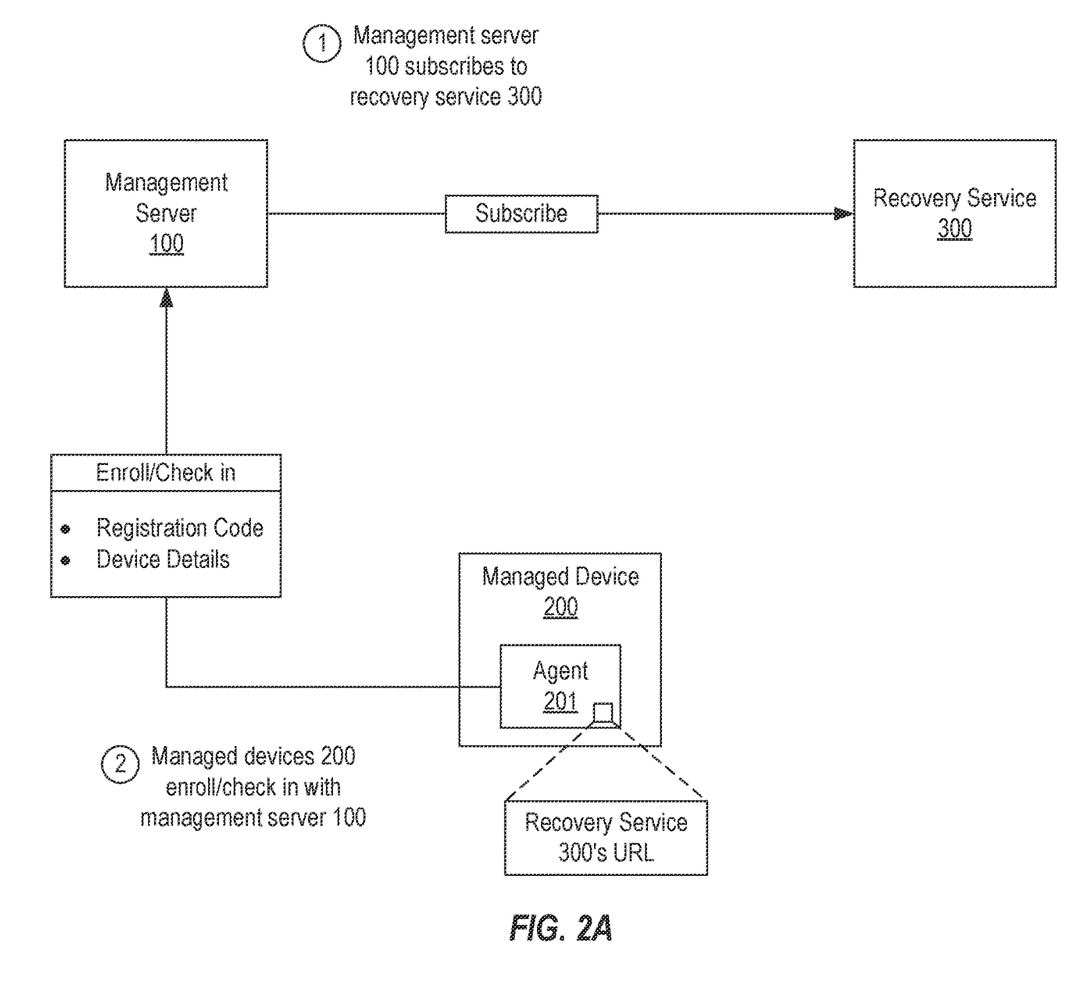
FIGS. 2A and 2B provide and example of how a recovery service 300 may be leveraged to enable intelligent recovery of managed devices in a multi-tenant cloud environment.
Figure 2B:
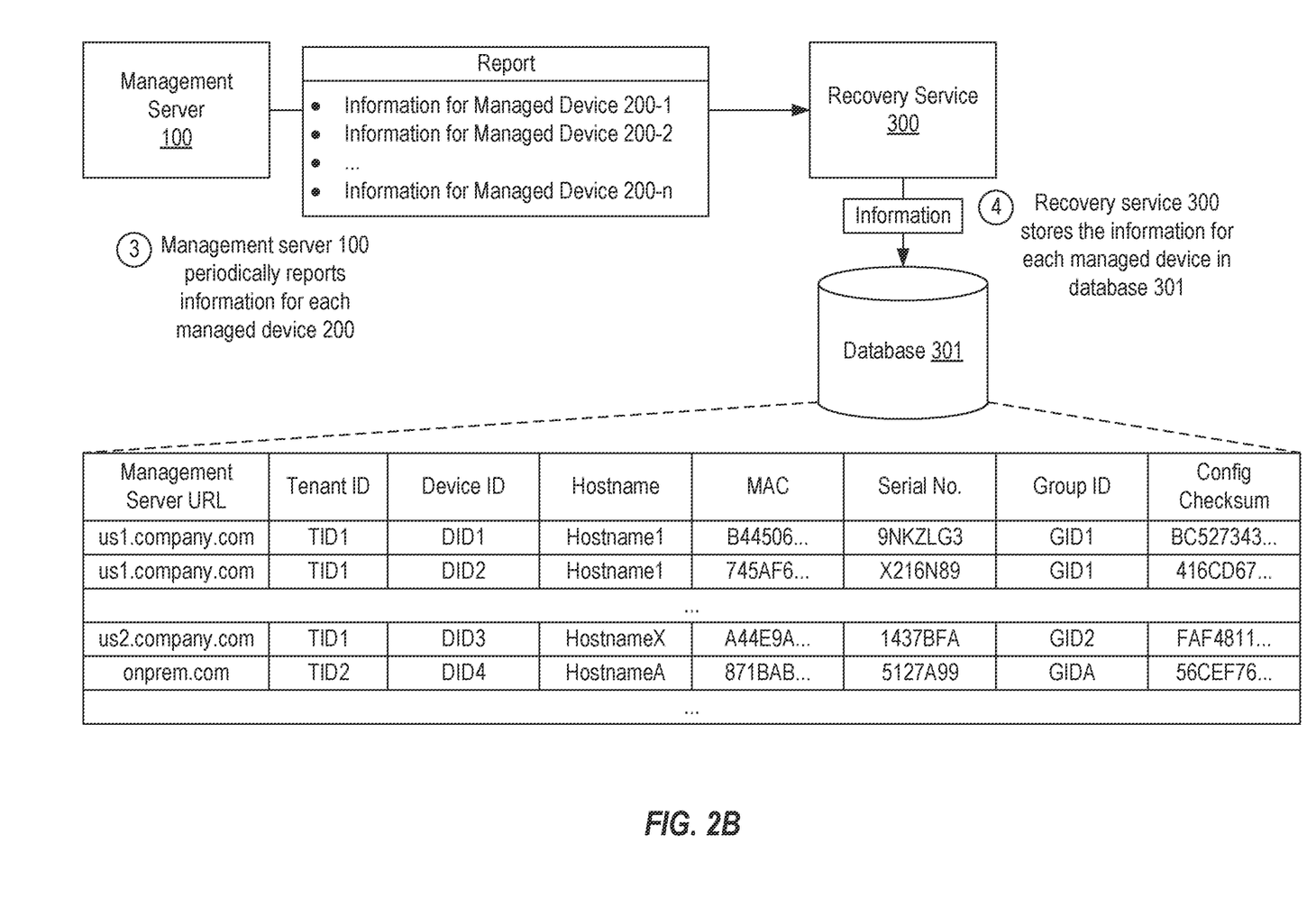

FIGS. 2A and 2B provide an example of how recovery service 300 may be leveraged to enable intelligent recovery of managed devices in a multi-tenant cloud environment. These figures represent steps that may be periodically performed to ensure that recovery service 300 will be available to perform the intelligent recovery when any one of managed devices 200 becomes unable check in with management server 100 or, in some embodiments, when managed devices 200 attempt to enroll with management server 100. Although not depicted, these same steps can be performed for any other management server and corresponding managed devices that may be configured to use recovery service 300.

Turning to FIG. 2A, in step 1, management server 100 can subscribe to recovery service 300. For example, an administrator could configure management server 100 to interface with recovery service 300 to perform the functionality described below. In some embodiments, management server 100 could provide information about management server 100 as part of subscribing such as any management URLs it may used to manage managed devices 200. Also, in embodiments where recovery service 300 may be used to enable managed devices 200 to enroll with management server 100, management server 100 could provide device details for managed devices 200 in this step.

In step 2, each managed device 200 can enroll or check in with management server 100. As part of this enrollment or check in, agent 201 on each managed device 200 may provide a registration code (e.g., an identifier of the tenant and the group to which the managed device pertains and possibly an identifier of the managed device for management purposes) and may provide various "device details" of the respective managed device 200 such as a hostname, a MAC address, a serial number, etc. As stated above, agent 201 could be configured to provide such device details as part of enrollment with management server 200 and periodically as part of checking in with management server 200. Also, an administrator could configure agent 201 to perform this enrollment or check in such as by providing to agent 201 the management URL and the identifiers it should use to construct the registration code.

FIG. 2A also represents that agent 201 can be configured to maintain recovery service 300's URL. For example, agent 201 may have a default configuration file which may define recovery service 300's URL. In some embodiments, recovery service 300's URL could be embedded in the binary of agent 201 so that recovery service 300's URL remains accessible to agent 201 even if its default configuration file becomes corrupted or inaccessible. In short, agent 201 can be configured to know how to communicate with recovery service 300 independent of any status it may have with management server 100.

Turning to FIG. 2B, in step 3, management server 100 can report information about its managed devices 200 to recovery service 300. This information could include the device details reported by agent 201 for each managed device 200 as well as the corresponding "management server details" such as the management server URL and tenant, device, and group IDs assigned to the managed device. Management server 100 could be configured to report such information periodically such as whenever any changes in the device details or the management server details occur (e.g., when new managed devices 200 are added to or removed from a group, when new groups are created, when device details are updated, etc.).

In step 4, recovery service 300 can store the information for each managed device 200 (and any other managed device) in database 301. As shown, database 301 may associate the device details with the corresponding management server details. For example, the first entry in database 301, which could represent managed device 200-1, indicates that a managed device 200 having a hostname of Hostname1, a MAC address of B44506 . . . , and a serial number of 9NKZLG3 is assigned to a tenant having a tenant ID of TID1, is assigned to a group having a group ID of GID1, has been assigned a device ID of DID1, and is configured to use us1.company.com as the management server URL for communicating with management server 100. The second entry, which could represent managed device 200-2, indicates that managed device 200-2 is assigned to the same tenant and group as managed device 200-2. The third entry, which could represent managed device 200-n, indicates that managed device 200-n is assigned to the same tenant as managed device 200-1 and 200-2 but to a different group from managed device 200-1 and 200-2. The last entry indicates that the corresponding managed device is assigned to a different tenant (TID2) that uses an on-premises management server (e.g., management server 101) that provides a management server URL of onprem.com.

FIG. 2B also shows that recovery service 300 could store a checksum in association with each entry in database 301. In some embodiments, this checksum could be generated by agent 201 from the configuration of managed device 200 (e.g., by generating a checksum of a default configuration file that agent 201 uses to configure managed device 200). In such cases, this checksum could be included in the enrollment and/or check in communications that agent 201 sends to management server 100 in step 2 and then included in the information that management server 100 reports to recovery service in step 3. Alternately, in some embodiments, agent 201 could be configured to report the checksum directly to recovery service 300. In any case, the checksum can be used to represent a state of a managed device 200's configuration when the managed device is successfully configured for management.

FIGS. 3A-3E provide and example of how a managed device 200 can be intelligently recovered. As stated above, in some embodiments, the functionality represented in this example could also be performed to enroll a managed device 200. In step 1, shown in FIG. 3A, it is assumed that managed device 200-1 loses connectivity to management server 100 due to agent 201 no longer having/knowing the management server details (e.g., management server 100's URL and/or any of the information necessary for constructing the correct registration code). This loss of connectivity could occur in different ways such as when an update to the operating system, to agent 201 or to another component is performed or as a result of tampering or user error which causes a file storing the necessary information to become lost, corrupted, or otherwise inaccessible. Also, in some embodiments, managed device 200-1 may not have connectivity simply because it has not yet been enrolled with management server 100.

Figure 3A:
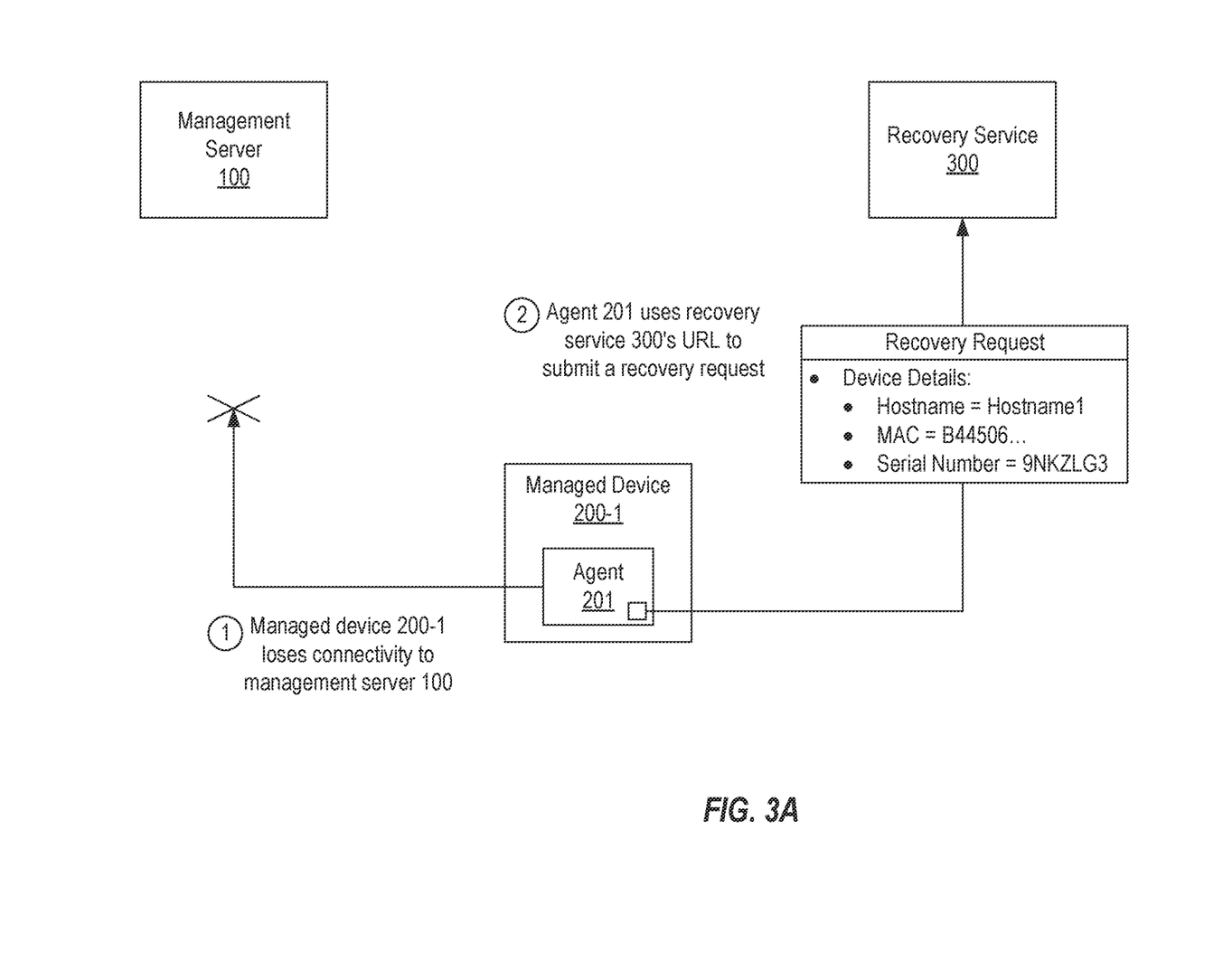
FIGS. 3A-3E provide an example of how a managed device can leverage recovery service to automatically recover connectivity to its management server.

In step 2, and upon detecting that it cannot connect with management server 100, agent 201 can use recovery service 300's URL to submit a recovery request. As stated above, agent 201 could maintain recovery service 300's URL in a default configuration file and/or recovery service 300's URL could be embedded in agent 201's binary so that recovery service 300 remains accessible even when other content on managed device 200-1 may be lost, corrupted, or inaccessible. As represented in FIG. 3A, agent 201 can include device details for managed device 200-1 in the recovery request such as the hostname, MAC address, and serial number.

Figure 3B:
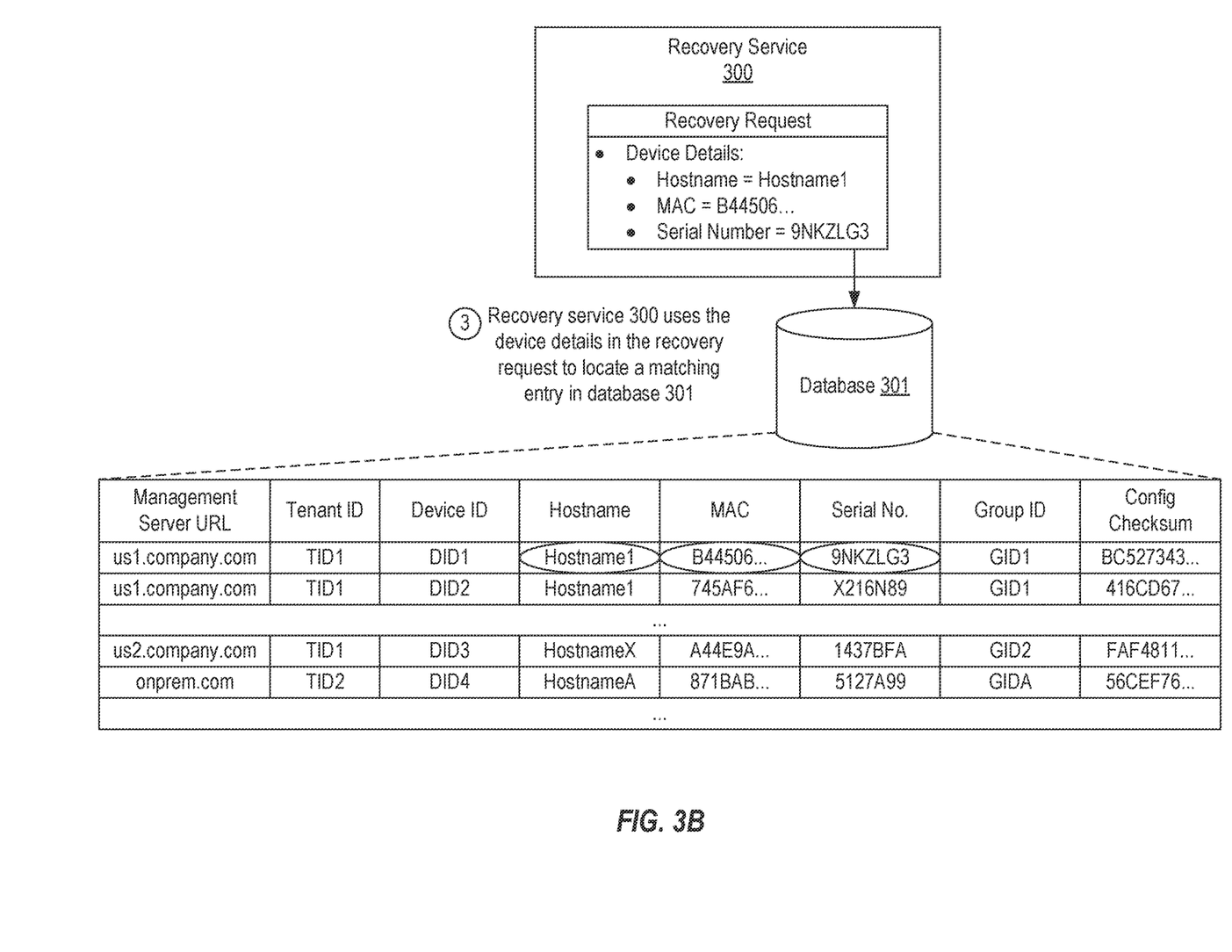

Turning to FIG. 3B, recovery service 300 is shown as having received the recovery request. Then, in step 3, recovery service 300 can use the device details specified in the recovery request to locate a matching entry in database 301. In this example, recovery service 300 will locate the first entry in database 301. If, however, a matching entry does not exist for a recovery request, recovery service 300 could attempt to identify the management server to which the managed device requesting recovery pertains and, if found, could notify the management server that manual intervention may be required. Notably, in scenarios where agent 201 is requesting recovery as part of enrollment as opposed to in response to lost connectivity, a match could be found due to management server 100 having provided the relevant information to recovery service 300 (e.g., as part of subscribing to recovery service 300 or in conjunction with deploying new managed devices).

Figure 3C:
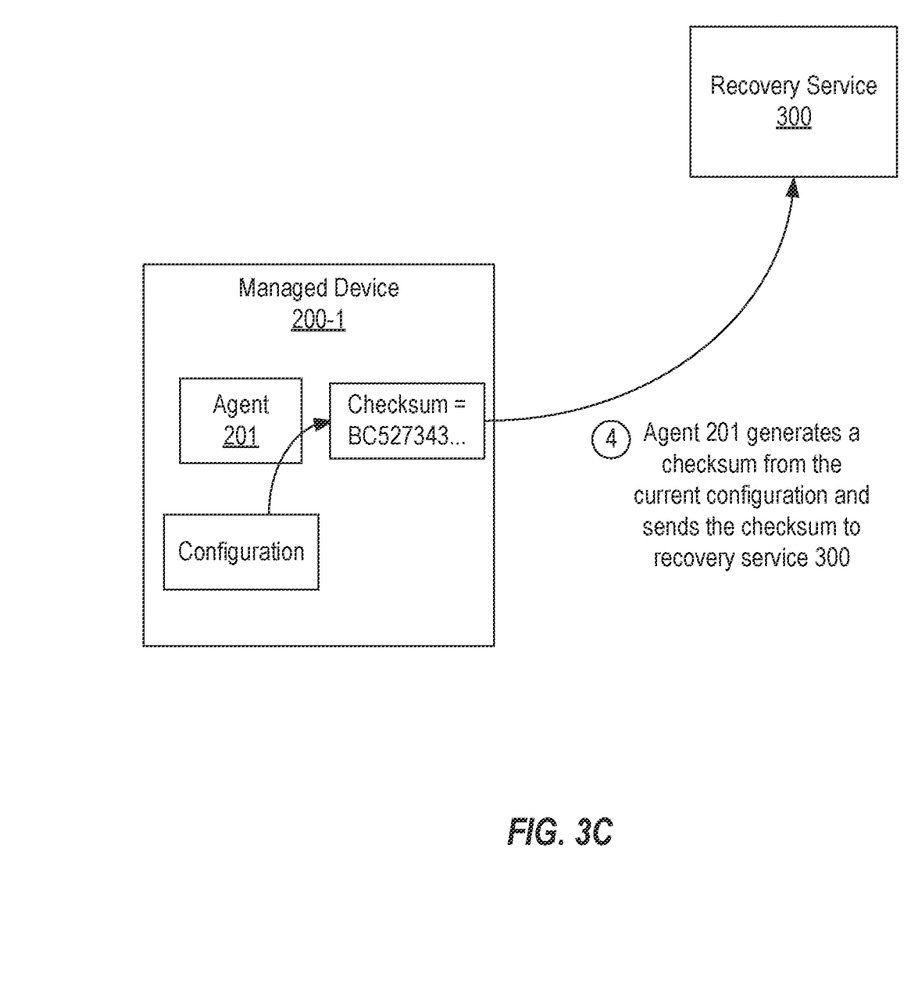
Figure 3D:
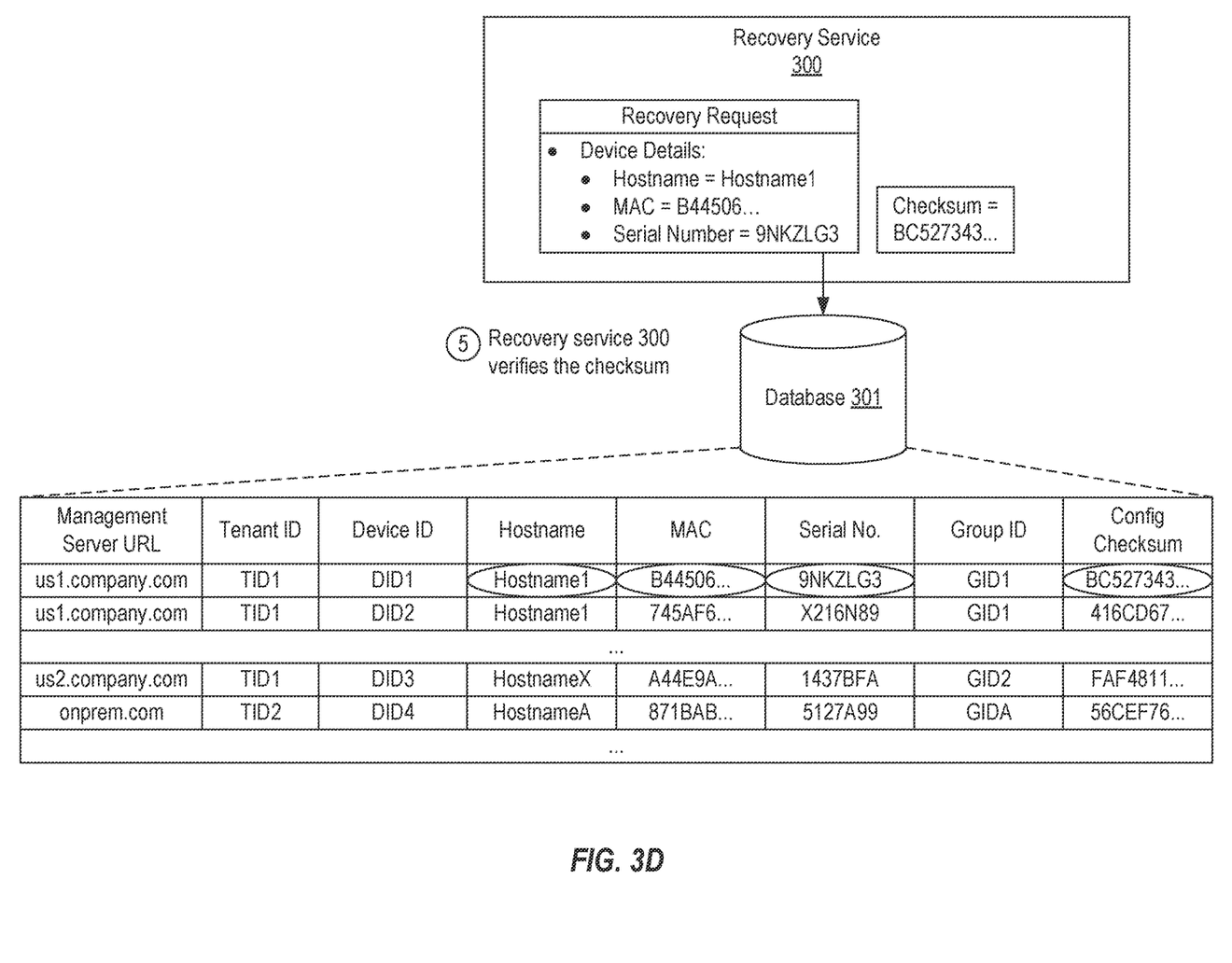

FIGS. 3C and 3D represent steps 4 and 5 that may be performed in some embodiments to add security to the recovery process. Although these steps are depicted separately from steps 2 and 3, they could be performed as part of steps 2 and 3 in some cases. In step 4, and as part of or in conjunction with sending the recovery request to recovery service 300, agent 201 can access a configuration of managed device 200-1 to create a checksum from the configuration and send the checksum to recovery service 300. For example, the configuration could be a file, a set of registry entries, or another set of stored parameters that may remain consistent even when a managed device loses connectivity to its management server.

Turning to FIG. 3D, in step 5, recovery service 300 can verify that the checksum received from agent 201 as part of or in conjunction with the recovery request matches the checksum stored in the corresponding entry in database 301. In this example, the checksum matches and therefore recovery service 300 can determine that the configuration of managed device 200-1 has not been altered since the time when the stored checksum was provided. Accordingly, this verification of the checksum can be used to detect scenarios where the loss in connectivity is due to tampering, whether malicious or otherwise. In some embodiments, if the checksum is not verified, recovery service 300 could move the managed device that is requesting recovery to a quarantine group and may perform a factory reset to remove any possible vulnerabilities. The managed device could then be re-enrolled.

Figure 3E:
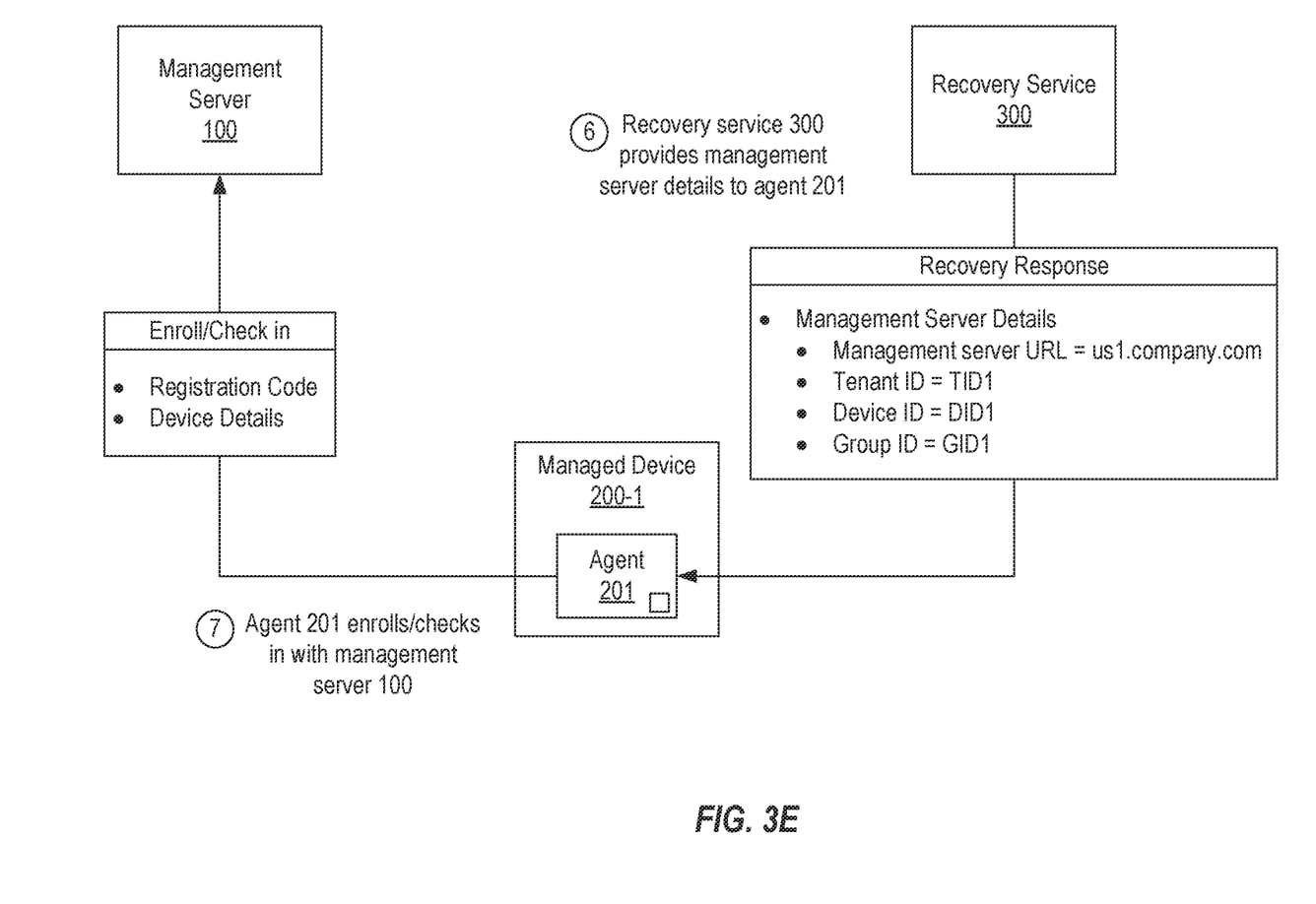

Turning to FIG. 3E, in step 6 and in response to finding a matching entry in database 301, recovery service 300 can send a recovery response to agent 201 on managed device 200-1. This recovery response can specify the management server details that are associated with the device details in database 301 such as the management server URL of management server 100 that managed device 200-1 is supposed to use and the tenant ID, device ID, and group ID that management server 100 had assigned to managed device 200-1.

Finally, in step 7, agent 201 can use the management server details provided in the recovery response to check in (or enroll) with management server 100 as if managed device 200-1 had never lost connectivity. For example, agent 201 could direct a communication to the management server URL specified in the recovery response and could construct a registration code using the other management server details. Upon establishing connectivity with management server 100, agent 201 can request any policies or other configurations that may be necessary to allow managed device 200-1 to resume its role in the managed device environment.

As can be seen, any of managed devices 200 as well as any other managed devices whose management server may be subscribed to use recovery service 300 can be automatically recovered using the techniques of the present invention. A single recovery service can therefore support recovery of managed devices spanning multiple tenants and multiple management servers.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A system comprising:
a plurality of management servers;
a plurality of managed devices, each of the managed devices being managed by one of the management servers; and
a recovery service that is executed by one or more processors and is accessible to each of the management servers and each of the managed devices;
wherein the recovery service is configured to receive, from each of the management servers, information about the respective managed devices that the management server manages, the information including device details for each of the managed devices and management server details assigned to each of the managed devices;
wherein the recovery service is configured to provide the management server details for a particular managed device when an agent implemented as software on the particular managed device provides device details matching the management server details in response to detecting that the particular managed device has lost connectivity with the respective management server;
wherein the agent on the particular managed device is configured to use the management server details provided by the recovery service to establish connectivity with the respective management server to thereby recover the particular managed device.

2. The system of claim 1, wherein the recovery service is configured to provide the management server details for the particular managed device when the agent on the particular managed device provides the device details matching the management server details only when the agent also provides a checksum matching a checksum associated with the management server details.

3. The system of claim 1, wherein the management servers include at least one management server that is hosted on premises and at least one management server that is hosted in the cloud.

4. The system of claim 1, wherein the device details include one or more of a hostname, a MAC address, or a serial number of the respective managed device.

5. The system of claim 1, wherein the device details include each of a hostname, a MAC address, and a serial number of the respective managed device.

6. The system of claim 1, wherein the management server details include, for each of the managed devices that the respective management server manages, one or more of a management server URL that the managed device should use to communicate with the respective management server, an identifier of a tenant to which the managed device is assigned, an identifier of a group to which the managed device is assigned, or an identifier assigned to the managed device.

7. The system of claim 1, wherein the management server details include, for each of the managed devices that the respective management server manages, each of a management server URL that the managed device should use to communicate with the respective management server, an identifier of a tenant to which the managed device is assigned, an identifier of a group to which the managed device is assigned, and an identifier assigned to the managed device.

8. The system of claim 1, wherein the recovery service is configured to store the information about each of the managed devices with a checksum for each of the managed devices.

9. The system of claim 8, wherein the checksum represents a configuration of the respective managed device.

10. The system of claim 8, wherein the recovery service is further configured to:
   receive, from the agent on a first managed device of the plurality of managed devices, a checksum; and
   compare the checksum received from the agent on the first managed device to the checksum stored for the first managed device;
   wherein the stored management server details are sent to the agent on the first managed device only when the checksum received from the agent on the first managed device matches the checksum stored for the first managed device.

\* \* \* \* \*